//  3,075,955
POLYEPOXY SULFONES
Paul S. Starcher, Charleston, and Samuel W. Tinsley, Charles W. McGary, Jr., and Charles T. Patrick, Jr., South Charleston, W. Va., assignors to Union Carbide Corporation, a corporation of New York
No Drawing. Filed Mar. 31, 1960, Ser. No. 18,866
21 Claims. (Cl. 260—79.3)

This invention relates to polyepoxy sulfones. In one aspect, the invention relates to a method for preparing polyepoxy sulfones.

The polyepoxy sulfones contemplated in the invention can be characterized by the following formula:

(I)    R—SO$_2$—R wherein each R, individually can be (a) a vic-epoxyalkyl radical in which the vic-epoxy group is at least one carbon atom removed from the sulfone group, (b) a vic-epoxycycloalkyl radical in which the vic-epoxy group is contained in the cycloaliphatic ring and is at least one carbon atom removed from the sulfone group, (c) a vic-epoxycycloalkylalkyl radical in which the vic-epoxy group is contained in the cycloaliphatic ring, (d) a vic-epoxyalkyl substituted vic-epoxycycloalkyl radical in which the vic-epoxy moieties are at least one carbon atom removed from the sulfone group, in which one vic-epoxy group is contained in the alkyl moiety and in which the remaining vic-epoxy group is contained in the cycloalkyl moiety, (e) a 3 - oxatricyclo [3.2.1.0$^{2,4}$]oct - 6 - yl radical, (f) a 3-oxatricyclo[3.2.1.0$^{2,4}$]oct-6-ylalkyl radical, and (g) a 3-oxatetracyclo[4.4.0.1$^{7,10}$.0$^{2,4}$]undec-8-yl radical. It should be noted at this time that expression "vic-epoxy," as used herein including the appended claims, refers to the group

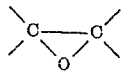

i.e., wherein the oxygen atom is bonded to vicinal carbon atoms. This term "vic-epoxy" is a recognized abbreviation for the expression "vicinal epoxy." The notation that the vic-epoxy group is contained in the cycloaliphatic ring indicates that the carbon atoms of said vic-epoxy group form a part of the cycloaliphatic ring or nucleus. The cycloaliphatic ring preferably contains from 5 to 7 carbon atoms including the epoxy carbon atoms. In addition, the expression "lower alkyl," as used therein including the appended claims, refers to a monovalent saturated aliphatic hydrocarbon radical which contains from 1 to 4 carbon atoms. Moreover, the "alkyl" moiety in the expression "vic-epoxycycloalkylalkyl" indicates that this moiety preferably contains up to 7 carbon atoms, is monovalently bonded to the "vic-epoxycycloalkyl" group, and also, is monovalently bonded to the sulfone group, i.e., —SO$_2$— group. In addition, by the term "vic-epoxyalkyl" as used herein including the appended claims, is meant a radical which contains from 3 to 18 carbons including the vic-epoxy carbon atoms.

With reference to Formula I supra, illustrative R variables include, among others, 2,3-epoxypropyl, 2,3-epoxybutyl, 2-methyl-2,3-epoxypropyl, 2-methyl-2,3-epoxybutyl, 2,3-epoxypentyl, 2,3-epoxyhexyl, 2,3-epoxyoctyl, 4,5-epoxyhexyl, 4,5-epoxypentyl, 5,6-epoxyoctyl, 10,11-epoxyundecyl, 9,10-epoxydecyl, 9,10-epoxyoctadecyl, 2,3-epoxycyclopentyl, 4-methyl-2,3-epoxycyclopentyl, 4-isopropyl-2,3-epoxycyclopentyl, 3,4-epoxycyclohexyl, 3-ethyl-3,4-epoxycyclohexyl, 2-methyl-3,4-epoxycyclohexyl, 6-n-butyl-3,4-epoxycyclohexyl, 5-amyl-3,4-epoxycyclohexyl, 2,4-diethyl-3,4-epoxycyclohexyl, 3,4-epoxycycloheptyl, 4,5-epoxycycloheptyl, 2-ethyl - 3,4 - epoxycycloheptyl, 2,3-epoxycyclopentylmethyl, 4 - methyl-2,3-epoxycyclopentylethyl, 3,4-epoxycyclohexylmethyl, 2-n-propyl-3,4-epoxycyclohexymethyl, 5-ethyl-3,4-epoxycyclohexylpropyl, 3,4-epoxycyclohexylamyl, 3,4 - epoxycycloheptylmethyl, 3,4-epoxycycloheptylethyl, 3 - oxatricyclo[3.2.1.0$^{2,4}$]oct-6-yl, 7-n-hexyl - 3 - oxatricyclo[3.2.1.0$^{2,4}$]oct-6-yl, 7-methyl-3-oxatricyclo[3.2.1.0$^{2,4}$]oct-6-yl, 3 - oxatricyclo[3.2.1.0$^{2,4}$]-oct-6-ylmethyl, 4-(3-oxatricyclo[3.2.1.0$^{2,4}$]oct-6-yl)butyl, alkyl substituted 3-oxatricyclo [3.2.1.0$^{2,4}$]oct-6-yl, lower alkyl-substituted 3 - oxatetracyclo[4.4.0.1$^{7,10}$.0$^{2,4}$]undec-8-yl and the like.

Illustrative subclasses of polyepoxy sulfones include, for example, bis(vic-epoxyalkyl) sulfones, bis(vic-epoxycycloalkyl) sulfones, bis(lower alkyl substituted vic-epoxycycloalkyl) sulfones, bis(vic-epoxycycloalkylalkyl) sulfones, bis(lower alkyl substituted vic-epoxycycloalkylalkyl) sulfones, bis(vic-epoxyalkyl substituted vic-epoxycycloalkyl sulfones, vic-epoxyalkyl vic-epoxycycloalkyl sulfones, vic-epoxyalkyl 3 - oxatricyclo[3.2.1.0$^{2,4}$]oct-6-yl sulfones, vic-epoxycycloalkyl
    3-oxatetracyclo[4.4.0.1$^{7,10}$.0$^{2,4}$]undec-8-yl
sulfones, vic-epoxyalkyl
    3-oxatetracyclo[4.4.0.1$^{7,10}$.0$^{2,4}$]undec-8-yl
sulfones, and the like.

Specific examples of polyepoxy sulfones include, for instance, bis(2,3-epoxypropyl) sulfone, bis(2-methyl-2,3-epoxypropyl) sulfone, bis(2,3-epoxybutyl) sulfone, bis-(2,3 - epoxypentyl)sulfone, bis(2 - ethyl-2,3-epoxyhexyl) sulfone, bis(10,11 - epoxyundecyl) sulfone, bis(9,10-epoxyoctadecyl) sulfone, bis(2,3-epoxycyclopentyl) sulfone, bis(lower alkyl substituted 2,3 - epoxycyclopentyl) sulfone, bis(2-ethyl-2,3-epoxycyclopentyl) sulfone, bis(4 - n - butyl - 2,3 - epoxycyclopentyl) sulfone, bis-3,4-epoxycyclohexyl) sulfone, bis(lower alkyl substituted 3,4-epoxycyclohexyl) sulfone, bis(2-methyl-3,4-epoxycyclohexyl) sulfone, bis(5-isopropyl-3,4-epoxycyclohexyl) sulfone, bis(3,4-epoxycycloheptyl) sulfone, bis(lower alkyl substituted 3,4-epoxycycloheptyl) sulfone, bis(2,3-epoxycyclopentylalkyl) sulfone, bis(2,3-epoxycyclopentylmethyl)sulfone, bis(2,3-epoxycyclopentylpropyl) sulfone, bis(3,4-epoxycyclohexylalkyl) sulfone, bis(3,4-epoxycyclohexylmethyl) sulfone, bis(3,4-epoxycyclohexylbutyl sulfone, bis(3,4-epoxycycloheptylalkyl) sulfone, bis-(3,4-epoxycycloheptylmethyl) sulfone, bis(3-oxatricyclo-[3.2.1.0$^{2,4}$]oct-6-yl) sulfone, bis(3-oxatricyclo [3.2.2.0$^{2,4}$] non-6-yl) sulfone, bis(3-oxatetracyclo [4.4.0.1$^{7,10}$0$^{2,4}$]undec-8-yl) sulfone, 2,3-epoxypropyl 2,3-epoxycyclopentyl sulfone, 2-methyl-2,3-epoxypropyl 2,3-epoxycyclopentylmethyl sulfone, 9,10-epoxyoctadecyl 3,4-epoxycyclohexyl sulfone, 2-methyl-2,3-epoxyhexyl 3-oxatricyclo-[3.2.1.0$^{2,4}$]oct-6-yl sulfone, 2,3-epoxycyclopentyl 3-oxatetracyclo[4.4.0.1$^{7,10}$.0$^{2,4}$]undec-8-yl sulfone, 2 - methyl-3,4-epoxycyclohexyl 2,3-epoxycyclopentylethyl sulfone, 3,4-epoxypentyl 2-n-butyl-3,4-epoxycyclohexyl sulfone, bis(3 - [4 - methyl-3,4-epoxypentyl]-3,4-epoxycyclohexyl) sulfone, bis(4 - [3-methyl-3,4-epoxypentyl]-3,4-epoxycyclohexyl) sulfone, bis(3-[3,4-epoxybutyl]-3,4-epoxycyclohexyl) sulfone, bis(4-[5,6 - epoxyhexyl]3,4 - epoxycyclohexyl) sulfone, bis(5-[5,6-epoxyhexyl] - 3,4 - epoxycyclohexyl) sulfone, bis (6-[4,5-epoxyheptyl]-3,4-epoxycyclohexyl) sulfone, bis(3-[3,4-epoxybutyl]-2,3-epoxycyclopentyl) sulfone, 2,3-epoxypropyl 3-oxatetracyclo
    [4.4.0.1$^{7,10}$.0$^{2,4}$]undec-8-yl
sulfone, 2-methyl-2,3-epoxypropyl
    3-oxatetracyclo[4.4.0.1$^{7,10}$.0$^{2,4}$]undec-8-yl
sulfone, 3,4-epoxybutyl
    3-oxatetracyclo[4.4.0.1$^{7,10}$.0$^{2,4}$]undec-8-yl
sulfone, 5,6-epoxyhexyl
    3-oxatetracyclo[4.4.0.1$^{7,10}$.0$^{2,4}$]undec-8-yl
sulfone, and the like.

The polyepoxy sulfones of the invention can be prepared by various routes. One route involves the reaction of, for example, bis(alkenyl) sulfones, bis(cycloalkenyl) sulfones, or bis(cycloalkenylalkyl) sulfones, with a peracid, e.g., perbenzoic acid, perpropionic acid, and peracetic acid, etc., preferably in an inert normally-liquid organic medium such as ethyl acetate, acetone, butyl acetate, and the like, at a temperature in the range of from about 0° to about 100° C., preferably from about 25° to about 80° C., for a period of time sufficient to introduce oxirane oxygen at the site of all of the carbon to carbon double bonds of the olefinic sulfone. The quantity of peracid consumed during the epoxidation reaction can be readily determined during the course of the reaction by well-known procedures. A residence time of from about several minutes to about several hours, e.g., 30 minutes to 18 hours, is satisfactory in many instances. Theoretically, to effect substantially complete epoxidation of the poly(olefinically unsaturated) sulfone reagent, at least a stoichiometric quantity of peracid per carbon to carbon double bond of sulfone reagent should be employed. The inert normally liquid organic vehicle and acid by-product can be recovered from the reaction product mixture, for example, by distillation under reduced pressure. If desired, the residue product can be subjected to fractional distillation, crystallization, and the like to obtain the polyepoxy sulfone product in high purity. The polyepoxy sulfones also can be prepared by the reaction of, for instance, bis(alkenyl) sulfides, bis(cycloalkenyl) sulfides, bis(cycloalkenylalkyl) sulfides, bis(bicycloalkenyl) sulfides with at least 4 mols of peracetic acid per mol of sulfide reagent under the operative conditions noted previously. In this invention, the sulfide moiety, i.e., —S—, is oxidized to the sulfone group, i.e., —SO$_2$—, and oxirane oxygen is introduced at the site of both carbon to carbon double bonds of the sulfide reagent. The Diels-Alder reaction provides a convenient method for preparing diunsaturated and polyunsaturated sulfones. For instance, a conjugated hydrocarbon diene, e.g., 1,3-butadiene, 1,3-hexadiene, isoprene, piperylene, cyclohexadiene, cycloheptadiene, myrcene, cyclopentadiene, alkyl substituted-cyclopentadiene, etc., can be reacted with less than about 0.5 mol of a diunsaturated sulfone, e.g., dialkenyl sulfone, divinyl sulfone, and the like, per mol of diene, at elevated temperatures, e.g., about 25° to about 150° C., and higher, to provide a bis(cycloalkenyl) sulfone, a bis(alkenyl substituted cycloalkenyl) sulfone or a bis(bicycloalkenyl) sulfone product. Polyepoxidation of this product in the manner explained supra produces the corresponding polyepoxy sulfone. A further route for preparing symmetrical and unsymmetrical polyepoxy sulfones involves the reaction of an haloalkene or halocycloalkene, e.g., 3-chloropropene, 3-chlorocyclopentene, 3-chlorotricyclo[4.3.0.1$^{2,5}$]7-decene, 4-chlorocyclohexene, etc., with the sodium salt of an alkenyl mercaptan or cycloalkenyl mercaptan, i.e., RSNa wherein R can be alkenyl or cycloalkenyl mercaptan, i.e., RSNa wherein R can be alkenyl or cycloalkenyl and in which the RSNa preferably is contained in the corresponding mercaptan as a vehicle, at elevated temperatures, e.g., from about 25° to 200° C., and higher, to produce the polyunsaturated sulfide. The resulting polyunsaturated sulfide product then can be reacted with a quantity of peracid which is at least sufficient to introduce oxirane oxygen at the site of the carbon to carbon double bonds, and additionally, to convert the sulfide moiety to the sulfone moiety. For instance, at least 4 moles of peracid is required to epoxidize one mole of dimethylallyl sulfide to the corresponding bis(2,3-epoxy-2-methylpropyl) sulfone. By way of a further illustration, at least 4 moles of peracid per mole of bis(tricyclo[4.3.0.1$^{2,5}$]-7-decen-3-yl) sulfide is required to epoxidize both carbon to carbon double bonds and to convert the sulfide group to the sulfone group to form the corresponding bis(3-oxatetracyclo[4.4.0.1$^{7,10}$0$^{2,4}$]undec-8-yl) sulfone.

A still further route for preparing the novel polyepoxy sulfones involves the reaction of unsaturated mercaptans, e.g., alkenyl mercaptan, cycloalkenyl mercaptan, etc., with dicyclopentadiene to produce the polyunsaturated sulfide, followed by epoxidation to produce the corresponding polyepoxy sulfone. Typical unsaturated mercaptans include allyl mercaptan, crotyl mercaptan, 4-hexenethiol, 6-octenethiol, 3-cyclohexenyl-3-propanethiol, 3-cyclohexen-yl - 12 - dodecanethiol, bicyclo[2.2.1] - 5 - hepten - 2 - yl - 6 - hexanethiol, bicyclo[2.2.1]-5 - hepten - 2 - yl - 8 - octanethiol, and the like.

The polyepoxy sulfone(s) of the invention can be polymerized in the presence of a catalytic quantity of a catalyst described hereinafter to produce useful products ranging from viscous liquids to tough, hard resins. A single diepoxy sulfone or a mixture of at least two diepoxy sulfones can be employed in the polymerization reaction. In general, when two diepoxy sulfones are employed, the concentration of the monomer can vary over the entire range, preferably from 5 to 95 weight percent. It is advantageous to add a catalyst in the temperature range from about 10 to about 100° C., preferably with agitation to insure homogeneity of the resulting admixture. For solid diepoxy sulfone(s), the catalyst is added at higher temperatures to obtain a uniform melt. Catalyst concentrations can be varied over a broad range and can be selected on the basis of the rate of polymerization desired and the polymerization temperature to be used. It has been found that catalyst concentrations from about 0.005 to 15 weight percent, preferably from about 0.01 to 5 weight percent, based on the weight of the period of time required for the polymerization reaction can range from several minutes to 24 hours, and longer depending on concentration of catalyst, temperature, catalyst, and the diepoxy monomer among other factors.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexane-diamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like; and the alkali metal hydroxides, e.g., sodium hydroxide, potassium hydroxide, and the like. When the catalyst and monomers are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

The hard, infusible resin products obtained are suitable for use in castings which can be machined to make a variety of useful products such as buttons, electrical components, and the like.

The compounds of the invention are useful as modifying and plasticizing agents for certain types of synthetic condensation resins and are also useful as stabilizers for various synthetic resins. Due to the presence of the vicinal-epoxy group,

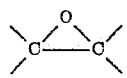

the novel compounds of the invention possess useful solvent properties. For example, they are compatible with many vinyl chloride and vinylidene chloride resins. Accordingly, the compounds of the invention can be used as plasticizers for these and other resins. By incorporating into the resin from about 5 to 50 percent by weight of these novel epoxides, a plasticized product is obtained which possesses useful resilient and flexible characteristics. The vinyl halide resins which can be satisfactorily plasticized by the compounds of this invention can be any vinyl halide polymer such as poly(vinyl chloride), vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. The compounds of this invention may be used alone or in conjunction with conventional plasticizers. In addition to their use as plasticizers, the compounds of this invention can be employed as stabilizers for chlorine-containing resins where they are effective even at low concentrations. Furthermore, the compounds of this invention can be reacted with active organic hardeners, e.g., polycarboxylic acids, polycarboxylic acid anhydrides, polyhydric alcohols, polyhydric phenols, and the like, to form resins useful in the molding, laminating, and encapsulating arts.

Reasonable variations and modifications of the invention can be made or carried out in the light of the above disclosure without departing from the spirit and scope thereof.

The following examples will serve to illustrate the practice of the invention:

EXAMPLE I

Preparation of Bis(3-Cyclohexenyl) Sulfone

Divinyl sulfone (236 grams, 2 moles), butadiene (432 grams, 8 moles), sulfuryl chloride (3 grams) and "Agerite Powder" (phenyl-beta-naphthylamine, 3 grams) were mixed together at —50° C. and charged to a 3-liter Adkins bomb which was fitted only with a pressure gauge and blow-off line aside from the usual agitation equipment. The temperature in the bomb was raised to 144° C., with agitation, and the internal pressure was 400 pounds per square inch, gauge. Heating was continued for 6.5 hours at 140–145° C. and the internal pressure decreased to a constant 125 pounds per square inch, gauge.

The bomb was allowed to cool to room temperature and the excess butadiene was vented to the atmosphere. Solid product weighing 562 grams was then removed from the bomb and recrystallized twice from methanol to give 246 grams (54.5 percent yield) of bis(3-cyclohexenyl) sulfone, melting point 139.5–140° C. Analysis: Found: 63.6% C, 8.4% H, 12.96% S. Theory for $C_{12}H_{18}O_2S$: 63.7% C, 8.0% H, 14.1% S. The compound was structurally confirmed by infrared analysis.

EXAMPLE II

Bis(3,4-Epoxycyclohexyl) Sulfone

Bis(3-cyclohexenyl) sulfone (45 grams) and ethylbenzene (150 grams) were charged to a 1-liter 4-neck flask equipped with stirrer, condenser, thermometer and dropping funnel. Peracetic acid in ethyl acetate (203 grams of 22.5 percent concentration) was added dropwise to the reaction vessel over a period of one hour at 40° C. At the end of the peracetic acid addition the reaction was maintained at 40° C. for an addiitonal 4 hours, at which time an analysis for peracetic acid indicated the reaction was essentially complete. The reaction mixture was then cooled to —30° C. by means of a Dry-Ice acetone bath, and a crop of crystals weighing 23 grams was obtained. Upon recrystallization from ethyl acetate the bis(3,4-epoxycyclohexyl) sulfone analyzed 79% pure by epoxide analysis. The filtrate from the first crop was reduced in volume, cooled in a Dry-Ice acetone bath, and a second crop of crystals weighing 13 grams was obtained. Crystallization of the second crop gave bis(3,4-epoxycyclohexyl) sulfone with a purity of 91.1% by epoxide analysis. Yield of both crops was 70.2%.

In a large run, bis(3-cyclohexenyl) sulfone (400 grams) dissolved in ethylbenzene (1600 grams) was treated with peracetic acid in ethyl acetate (1200 grams of 28.0 percent concentration) at 50° C. over a period of 5 hours and 20 minutes. The reaction mixture was then added dropwise to the kettle of a 20 x 1.3-inch column containing refluxing ethylbenzene under reduced pressure. Unreacted peracetic acid, ethyl acetate, ethylbenzene, and acetic acid were removed as a distillate. When the kettle residue was reduced in weight to 800 grams it was removed from the column, cooled in brine bath and the product crystallized. After filtering and drying there was obtained 245 grams of bis(3,4-epoxycyclohexyl) sulfone which had a purity of 96.1% by epoxide analysis. The filtrates from crop 1 were combined and placed on a still and reduced in volume. The concentrated filtrates were cooled to Dry-Ice temperature, filtered, recrystallized from acetone, and dried. There was obtained 96 grams of white crystalline bis(3,4-epoxycyclohexyl) sulfone, having a purity of 96.8% by epoxide analysis, and a melting point of 127–129° C. Analysis calculated for $C_{12}H_{14}O_4S$: 55.7% C, 6.9% H. Found: 55.72% C, 7.27 H.

The combined weights (341 grams) of both crops represented a yield of 75.0%.

EXAMPLE III

Preparation of Bis(Methyl-3-Cyclohexenyl) Sulfones

Divinyl sulfone (236 grams, 2 moles), "blending Naphtha" (containing approximately 50 percent of a mixture of isoprene and piperylene) (792 grams, 6 moles) sulfuryl chloride (3 grams) and "Agerite Powder" (3 grams) were mixed together and reacted at 150–155° C. in an Adkins bomb as described in Example I. The product, a liquid weighing 972 grams was stripped free of low-boiling materials in a short Claisen-type still to a final kettle temperature of 130° C. at 2 millimeters pressure. The product was then distilled in the same apparatus to give 458 grams (90 percent yield based on the starting sulfone) of bis (methyl-3-cyclohexenyl) sulfones boiling at 170–180° C./ 0.9 millimeter of Hg and having a refractive index of 1.5294 ($n$ 30/D). The product was confirmed by elemental and infrared spectrum analyses. Found: 66.9% C, 9.1% H, 12.6% S. Theory: 66.2% C, 8.7% H, 12.6% S.

EXAMPLE IV

Bis(Methyl-3,4-Epoxycyclohexyl) Sulfones

Bis(methyl-3-cyclohexenyl) sulfones (40 grams) was charged to a 4-neck 500 cubic centimeter flask equipped with stirrer, condenser, thermometer, and dropping funnel. Peracetic acid in ethyl acetate (140 grams of 21.2 percent concentration) was added dropwise to the stirred sulfone, at 40° C. The reaction was exothermic and required external cooling with an ice bath. The peracetic acid was added over a period of 1.2 hours and the reaction was continued at 40° C. for an additional 4 hours and 30 minutes at which time an analysis for peracetic acid indicated that the reaction was essentially complete. The reaction mixture was then fed dropwise to a kettle fitted with a 20 x 1.3-inch column, containing refluxing ethylbenzene and operated at such a pressure that the kettle temperature could be held at 40° C. throughout the addition. Ethyl acetate, peracetic acid, acetic acid, and ethylbenzene were removed as a distillate. The column residue was transferred to a one-plate column and stripped at 40° C. and 1 millimeter. The residue product, bis (methyl-3,4-epoxycyclohexyl) sulfones, was a brown syrupy liquid with a purity of 67.9% by epoxide analysis, an unsaturation of 3.9%. Essentially a quantitative yield was realized.

EXAMPLE V

Preparation of Bis(Bicyclo[2.2.1]-5-hepten-2-yl) Sulfone

The equipment consisted of a 2-liter 4-neck reaction flask which was fitted with a mechanical stirrer, thermometer, condenser and dropping funnel. Divinyl sulfone (170 grams, 1.44 moles), benzene (300 grams) and hydroquinone (0.2 gram) were stirred together in the reaction flask while adding 208 grams (3.16 moles) of freshly distilled cyclopentadiene dropwise during about 1 hour and cooling the reaction mixture as required to control the temperature at 50–60° C. The stirring was continued for about an hour and the reaction product was allowed to stand overnight at room temperature. The reaction mixture was transferred to a one-liter boiling flask and stripped free of solvent in a short Claisen-type still to a final kettle temperature of 150° C. at 2 millimeters. The residue product was then distilled and there was obtained 170 grams of a fraction having a boiling point of 150–165° C., at 0.5 millimeter which crystallized on standing. A small sample was recrystallized from isopropyl ether and had a melting point of 89–92° C. The product bis(bicyclo[2.2.1]-5-hepten-2-yl) sulfone was confirmed by elemental and infrared spectrum analyses. Found 66.9% C, 7.5% H, 12.5% S. Theory for $C_{14}H_{18}O_2S$: 67.2% C, 7.2% H, 12.8% S.

EXAMPLE VI

*Bis(3-Oxatricyclo[3.2.1.0$^{2,4}$]Oct-6-Yl) Sulfone*

A solution of bis(bicyclo[2.2.1]-5-hepten-2-yl) sulfone (50 g.) in 50 grams of ethyl acetate was charged to a 0.5 liter 4-neck flask equipped with stirrer, condenser, thermometer, and dropping funnel. Peracetic acid in ethyl acetate (143 grams of 26.5 percent concentration) was added dropwise to the stirred sulfone at 40° C. over a period of 1.75 hours, after which the reaction was continued at 40° C. for an additional 3.25 hours at which time an analysis for peracetic acid indicated that the reaction was essentially complete. The reaction mixture was added dropwise to the kettle of a still containing ethylbenzene under reflux, equipped with a brine-cooled head, and operated under reduced pressure. Peracetic acid, ethyl acetate, ethylbenzene and acetic acid were removed as a distillate. The kettle material was removed from the still, cooled and filtered. A crystalline material weighing 33 grams was obtained. The material, bis(3-oxatricyclo[3.2.1.0$^{2,4}$]oct-6-yl) sulfone was recrystallized from ethylbenzene and filtered. It had a purity of 74.9% by epoxide analysis, a melting point of 150–153° C., and it was obtained in a yield of 58.5% of the theoretical. Analysis: Calculated for $C_{14}H_{18}O_4S$: 59.5% C, 6.43% H, Found: 59.73% C, 6.68% H.

In an analogous procedure as set forth in Example VI, the following compounds are prepared: bis(3,4-epoxycyclohexylmethyl) sulfone; 2,3-epoxypropyl 2,3-epoxycyclopentyl sulfone; 4,5-epoxyhexyl 3,4-epoxycyclohexylmethyl sulfone; 3,4-epoxycyclohexyl 3,4-epoxycyclohexylmethyl sulfone; bis(7-methyl - 3-oxatricyclo[3.2.1.0$^{2,4}$]oct - 6-yl) sulfone; bis(3-oxatetracyclo[4.4.0.1$^{7,10}$0$^{2,4}$]undec - 8 - yl) sulfone; 3,4-epoxybutyl 3-oxatetracyclo[4.4.0.1$^{7,10}$0$^{2,4}$]undec-8-yl sulfone; 2,3-epoxycyclopentyl 3-oxatetracyclo[4.4.0.1$^{7,10}$0$^{2,4}$]-undec-8-yl sulfone; 3,4-epoxycyclohexylmethyl 3-oxatetracyclo[4.4.0.1$^{7,10}$0$^{2,4}$]undec-8-yl sulfone; 3 - oxatricyclo[3.2.1.0$^{2,4}$]oct - 6-yl 3 - oxatetracyclo[4.4.0.1$^{7,10}$0$^{2,4}$]undec-8-yl sulfone.

EXAMPLE VII

*Bis(2,3-Epoxy-2-Methylpropyl) Sulfone*

Dimethallyl sulfone (34.8 grams) and ethylbenzene were charged to a 0.5 liter 4-neck flask equipped with stirrer, condenser, thermometer, and dropping funnel. Peracetic acid in ethyl acetate (152 grams of 25 percent material) was added dropwise for 20 minutes at 40° C. The reaction was not visibly exothermic and was raised to 60° C. and held at this temperature for 5 hours and 10 minutes at which time an analysis for peracetic acid indicated the reaction was essentially complete. Ethylbenzene (100 grams) was added to the reaction mixture and placed on a 15 x 1-inch column for removal of ethyl acetate, ethylbenzene, and acetic acid continuously as a distillate. The kettle material was cooled in a Dry-Ice acetone bath, and a crop of crystals precipitated. The crystals were filtered and recrystallized from ethylbenzene. The precipitate, bis(2,3-epoxy-2-methylpropyl) sulfone, after filtering and drying weighed 24 grams (58% yield), a purity of 83.8% by epoxy analysis and a melting point of 46–48° C.

EXAMPLE VIII

*Bis(2,3-Epoxy-2-Methylpropyl) Sulfone*

Dimethallyl sulfone (174 grams) and ethylbenzene were charged to a 2-liter 4-neck flask equipped with stirrer, condenser, thermometer and dropping funnel. To the stirred dimethallyl sulfone-ethylbenzene mixture, peracetic acid in ethyl acetate (760 grams of 25 percent concentration) was added dropwise for a period of one hour and 15 minutes at 60° C. At the end of the peracetic acid addition the reaction mixture was held at 60° C. for an additional 4 hours and 45 minutes at the end of which time an analysis for peracetic acid indicated the reaction was essentially complete. The reaction mixture was then fed dropwise into the kettle of a still column operated at 50 millimeters and having 700 grams of ethylbenzene under reflux. The ethyl acetate, acetic acid, and ethylbenzene were removed continuously as a distillate. When the kettle residue had been reduced to a weight of 300 grams, it was removed from the column and cooled in a Dry-Ice acetone bath, filtered, recrystallized from ethylbenzene, washed with cooled 35–37° C. petroleum ether and dried in a vacuum desiccator. The first crop of bis(2,3-epoxy-2-methylpropyl) sulfone (102 grams) had a melting point of 46–48° C., and a purity by epoxide analysis of 87.4%. Analysis: Calculated for $C_8H_{14}O_4S$: 46.55% C, 6.79% H. Found: 46.85% C, 7.07% H. Two more crops of crystals were obtained from the filtrate and the yield of the three crops of bis(2,3-epoxy-2-methylpropyl) sulfone was 70.5%.

In an analogous procedure as set forth in Example VIII, the following compounds are prepared: bis(2,3-epoxybutyl) sulfone; 2,3-epoxybutyl 2,3-epoxy-2-methylpropyl sulfone; 2,3-epoxybutyl 10,11-epoxyundecyl sulfone; and bis(9,10-epoxyoctadecyl) sulfone.

EXAMPLE IX

*Preparation of Bis[3-(4-Methyl-3-Pentenyl) 3-Cyclohexenyl] Sulfone*

The equipment consisted of a 2-liter, 4-neck reaction flask which was fitted with a mechanical stirrer, thermometer, condenser and dropping funnel. Toluene (200 grams), 7-methyl-3-methylene-1,6-octadiene (2.5 moles, 400 grams of a commercial product called "myrcene" and assayed at 85% pure), and hydroquinone, (3 grams) were stirred in a flask and heated to 125° C. Then, during the next 20 minutes, divinyl sulfone (118 grams, 1 mole) was fed dropwise to the flask. After a short induction period, the reaction became mildly exothermic and some cooling was required to keep the reaction temperature from rising above 125° C. After the addition of the divinyl sulfone, the temperature gradually subsided to 100° C. during the next 20 minutes. Heat was applied and the product was heated at 130–140° C. for two hours. The product was charged to a Claisen-type still and stripped free of solvent under reduced pressure. The kettle residue was diluted with 200 grams of isopropyl ether, treated with activated carbon and then filtered to remove the color. The product was again charged to the Claisen still and stripped free of solvent to a final kettle temperature of 150° C. at 5 millimeters. There was obtained 370 grams of an amber colored residue product which was rather viscous when cooled to room temperature. Analysis found: 74.7% C, 10.2% H, 7.9% S; calculated for $C_{24}H_{38}O_2S$: 73.8% C, 9.7% H, 8.2% S.

EXAMPLE X

*Preparation of Bis(3-[4-Methyl-3,4-Epoxypentyl]-3,4-Epoxycyclohexyl) Sulfone*

To 97.5 grams of bis(3-[4-methyl-3-pentenyl]-3-cyclohexenyl) sulfone was added dropwise 314 grams of a 27.9 percent solution of peracetic acid in ethyl acetate over a period of one hour at 15° C. The reaction was exothermic and required constant cooling to maintain the temperature at 15° C. After an additional four-hour reaction period at 15° C. an analysis for peracetic acid indicated that the reaction was 97.9 percent completed. The volatiles were removed from the reaction mixture by codistillation with ethylbenzene under reduced pressure so that the kettle temperature never exceeded 40° C. The residue product was obtained by final stripping to a kettle temperature of 70° C. at 2 millimeters pressure. The residue product was a light-colored viscous tan liquid. Its infrared spectrum indicated the absence of double bonds (6.0–6.2) and had a strong band at 11.4 characteristic of the epoxide group.

EXAMPLE XI

*Preparation of Bis(2-Methyl-3-Cyclohexenyl)Sulfone*

A mixture of divinyl sulfone (1 mole), piperylene (4 moles), sulfuryl chloride (2 grams), and "Agerite Powder" (2 grams) is heated in an Adkins bomb at 160° C. for approximately 8 hours. The reaction product is removed after cooling the bomb and is fractionally distilled. There is isolated approximately a 50% yield of bis(2-methyl-3-cyclohexenyl) sulfone having a sulfur analysis and infrared spectrum which are compatible with the assigned structure.

EXAMPLE XII

*Preparation of Bis(2-Methyl-3,4-Epoxycyclohexyl) Sulfone*

The bis(2-methyl-3-cyclohexenyl) sulfone from Example XI is dissolved in an equal weight of ethyl acetate and is heated to 50° C. To this solution is added dropwise an excess (2.5 moles of peracetic acid per mole of unsaturated sulfone) of a 25% peracetic acid solution in ethyl acetate. After the addition is completed the reaction mixture is heated at 50° C. until an analysis for peracetic acid indicates that the reaction has substantially ceased. The reaction mixture is then fed dropwise to a still kettle containing refluxing ethylbenzene under such a pressure as to keep the temperature at 50° C. The excess peracetic acid, acetic acid, ethyl acetate and some ethylbenzene are removed continuously at the still head. After the addition is completed, the ethylbenzene is removed under vacuum leaving a light-colored residue product, bis(2-methyl - 3,4 - epoxycyclohexyl) sulfone, which was identified from its infrared spectrum and analysis for epoxide.

EXAMPLE XIII

Bis(3,4-epoxycyclohexyl) sulfone (1.0 gram) and 0.01 gram of piperidine-boron trifluoride were mixed in test tubes. The mixtures were cured for 21 hours at 120° C. and for six hours at 160° C. There was obtained a hard, infusible homopolymeric product.

EXAMPLE XIV

Bis(3,4-epoxycyclohexyl) sulfone (1.0 gram) and .003 gram of sulfuric acid as 15 percent aqueous solution were mixed in test tubes. The mixtures were cured for 21 hours at 120° C. and for six hours at 160° C. There was obtained a hard, infusible homopolymeric product.

EXAMPLE XV

Bis(3,4-epoxycyclohexyl) sulfone and .003 gram of potassium hydroxide as 17.2 percent ethylene glycol solution were mixed in test tubes. The mixtures were cured for 21 hours at 120° C. and six hours at 160° C. There was obtained a hard, infusible homopolymeric product.

EXAMPLE XVI

Bis(2,3-epoxy-2-methylpropyl) sulfone (1.06 grams) and 0.0006 gram of sulfuric acid as a 5 percent aqueous solution were mixed in test tubes. The mixtures were heated for 31 hours at 120° C. and at 160° C. for six hours. There was obtained a soft homopolymeric product.

EXAMPLE XVII

Bis(2,3-epoxy-2-methylpropyl) sulfone (1.06 grams) and 0.02 gram of trimethylaminomethylphenol were mixed in test tubes. The mixtures were heated for 31 hours and at 160° C. for six hours. There was obtained a very viscous homopolymeric product.

In an analogous manner 0.01 gram of piperidine-boron fluoride was substituted for the catalyst. A soft homopolymeric product was obtained.

EXAMPLES XVIII–XIX

A mixture of bis(2-methyl-2,3-epoxycyclohexyl) sulfone, bis(3-methyl-2,3-epoxycyclohexyl) sulfone and bis-(4-methyl-2,3-epoxycyclohexyl) sulfone and various hardening agents were mixed and were heated at 120° C. for 10 to 35 hours and at 160° C. for six hours to effect cure. The following data were observed.

| Catalyst | Weight, grams | Weight of Polyepoxy Sulfones, grams | Resin Description |
|---|---|---|---|
| Piperidine: boron fluoride | 0.2 | 2.0 | hard, infusible homopolymeric product. |
| Sulfuric acid (25 percent aqueous solution). | 0.02 | 2.0 | Do. |

What is claimed is:

1. A polyepoxy sulfone characterized by the general formula:

$$R\text{—}SO_2\text{—}R$$

wherein each R, individually represents a member selected from the class consisting of (a) vic-epoxyalkyl having from 3 to 18 carbon atoms and in which the vic-epoxy group is at least one carbon atom removed from the sulfone group, (b) a vic-epoxycycloalkyl radical having from 5 to 7 carbon atoms in the cycloalkyl ring and in which the vic-epoxy group is at least one carbon atom removed from the sulfone group, (c) a vic-epoxycycloalkylalkyl radical having from 5 to 7 carbon atoms in the cycloalkyl ring and in which the alkyl moiety contains up to 7 carbon atoms, (d) a vic-epoxyalkyl substituted vic-epoxycycloalkyl radical wherein the vic-epoxyalkyl moiety contains from 3 to 18 carbon atoms, wherein the vic-epoxycycloalkyl moiety contains from 5 to 7 carbon atoms in the cycloalkyl ring, and wherein the vic-epoxy groups are at least one carbon atom removed from the sulfone group, (e) a 3-oxatricyclo[3.2.1.0$^{2,4}$]oct-6-yl radical, (f) a 3-oxatricyclo[3.2.1.0$^{2,4}$]oct-6-ylalkyl radical in which the alkyl moiety contains up to 7 carbon atoms, and (g) 3-oxatetracyclo[4.4.0.1$^{7,10}$0$^{2,4}$]undec-8-yl radical.

2. A bis(vic-epoxyalkyl) sulfone wherein the vic-epoxy moiety is at least one carbon atom removed from the sulfone moiety and wherein each vic-epoxyalkyl moiety contains from 3 to 18 carbon atoms.

3. A bis(vic-epoxycycloalkyl) sulfone wherein the vic-epoxy moiety is at least one carbon atom removed from the sulfone moiety and the cycloalkyl ring contains from 5 to 7 carbon atoms.

4. A bis(vic-epoxycycloalkylalkyl) sulfone wherein the cycloalkyl ring contains from 5 to 7 carbon atoms and wherein the alkyl moiety contains up to 7 carbon atoms.

5. The vic - epoxyalkyl vic - epoxycycloalkyl sulfone wherein the vic-epoxy moieties are at least one carbon atom removed from the sulfone moiety, wherein the vic-epoxyalkyl moiety contains from 3 to 18 carbon atoms, and wherein the cycloalkyl ring contains from 5 to 7 carbon atoms.

6. Bis(alkyl-substituted 3,4-epoxycyclohexyl) sulfone.

7. Bis(alkyl-substituted - 3 - oxatricyclo[3.2.1.0$^{2,4}$]oct-6-yl) sulfone.

8. Vic-epoxyalkyl 3-oxatetracyclo[4.4.0.1$^{7,10}$0$^{2,4}$]undec-8-yl sulfone wherein the vic-epoxyalkyl moiety contains from 3 to 18 carbon atoms.

9. Bis(3-oxatricyclo[3.2.1.0$^{2,4}$]oct-6-yl) sulfone.

10. Bis(3-oxatetracyclo[4.4.0.1$^{7,10}$0$^{2,4}$]undec-8-yl) sulfone.

11. Bis(2,3-epoxy-2-methylpropyl) sulfone.

12. Bis(3,4-epoxycyclohexyl) sulfone.

13. Bis(3,4-epoxy-2-methylcyclohexyl) sulfone.

14. The homopolymer of the polyepoxy sulfone defined in claim 1.

15. The homopolymer of the polyepoxy sulfone defined in claim 2.

16. The homopolymer of the polyepoxy sulfone defined in claim 3.

17. The homopolymer of bis(3,4-epoxycyclohexyl) sulfone.

18. The homopolymer of bis(2,3-epoxy-2-methylpropyl) sulfone.

19. A process which comprises reacting a polyepoxy sulfone having the formula:

$$R-SO_2-R$$

wherein each R, individually represents a member selected from the class consisting of (a) vic-epoxyalkyl having from 3 to 18 carbon atoms and in which the vic-epoxy group is at least one carbon atom removed from the sulfone group, (b) a vic-epoxycycloalkyl radical having from 5 to 7 carbon atoms in the cycloalkyl ring and in which the vic-epoxy group is at least one carbon atom removed from the sulfone group, (c) a vic-epoxycycloalkyl alkyl radical having from 5 to 7 carbon atoms in the cycloalkyl ring and in which the alkyl moiety contains up to 7 carbon atoms, (d) a vic-epoxyalkyl substituted vic-epoxycycloalkyl radical wherein the vic-epoxyalkyl moiety contains from 3 to 18 carbon atoms, wherein the vic-epoxycycloalkyl moiety contains from 5 to 7 carbon atoms in the cycloalkyl ring, and wherein the vic-epoxy groups are at least one carbon atom removed from the sulfone group, (e) a 3-oxatricyclo[3.2.1.0$^{2,4}$]oct-6-yl radical, (f) a 3-oxatricyclo[3.2.1.0$^{2,4}$]oct-6-ylalkyl radical in which the alkyl moiety contains up to 7 carbon atoms, and (g) a 3-oxatetracyclo[4.4.0.1$^{7,10}$0$^{2,4}$]undec-8-yl radical; with a catalyst selected from the group consisting of metal halide Lewis acids, strong mineral acids, the saturated aliphatic hydrocarbon sulfonic acids, the aromatic hydrocarbon sulfonic acids, and the alkali metal hydroxides; at a temperature in the range from about 25° C. to about 250° C.; for a period of time sufficient to produce a polymer.

20. The process of claim 19 wherein a mixture of polyepoxy sulfones is employed.

21. A polymer containing a polyepoxy sulfone in polymerized form with a different polyepoxy sulfone, said polyepoxy sulfones conforming to the following structural formula:

$$R-SO_2-R$$

wherein each R, individually represents a member selected from the class consisting of (a) vic-epoxyalkyl having from 3 to 18 carbon atoms and in which the vic-epoxy group is at least one carbon atom removed from the sulfone group, (b) a vic-epoxycycloalkyl radical having from 5 to 7 carbon atoms in the cycloalkyl ring and in which the vic-epoxy group is at least one carbon atom removed from the sulfone group, (c) a vic-epoxycycloalkylalkyl radical having from 5 to 7 carbon atoms in the cycloalkyl ring and in which the alkyl moiety contains up to 7 carbon atoms, (d) a vic-epoxyalkyl substituted vic-epoxycycloalkyl radical wherein the vic-epoxyalkyl moiety contains from 3 to 18 carbon atoms, wherein the vic-epoxycycloalkyl moiety contains from 5 to 7 carbon atoms in the cycloalkyl ring, and wherein the vic-epoxy groups are at least one carbon atom removed from the sulfone group, (e) a 3-oxatricyclo[3.2.1.0$^{2,4}$]oct - 6 - yl radical, (f) a 3-oxatricyclo[3.2.1.0$^{2,4}$]oct-6-ylalkyl radical in which the alkyl moiety contains up to 7 carbon atoms, and (g) 3-oxatetracyclo[4.4.0.1$^{7,10}$0$^{2,4}$]undec-8-yl radical.

References Cited in the file of this patent

UNITED STATES PATENTS

| | | |
|---|---|---|
| 2,671,771 | Simons | Mar. 9, 1954 |
| 2,765,322 | Beavers | Oct. 2, 1956 |
| 2,944,871 | Atkinson | July 12, 1960 |

FOREIGN PATENTS

| | | |
|---|---|---|
| 1,202,723 | France | Jan. 12, 1960 |